United States Patent
Kang et al.

(10) Patent No.: US 10,704,984 B2
(45) Date of Patent: Jul. 7, 2020

(54) COMPACT MODULAR TRANSFER FUNCTION EVALUATION SYSTEM

(71) Applicant: TRW AUTOMOTIVE U.S. LLC, Livonia, MI (US)

(72) Inventors: Shaoying Kang, Ann Arbor, MI (US); Robert J. Newton, Chesterfield, MI (US); Marwan Waheed, Farmington Hills, MI (US); Michael L. Babala, Plymouth, MI (US); Mohammad Masud Siraj, Novi, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 427 days.

(21) Appl. No.: 15/531,625

(22) PCT Filed: Dec. 8, 2015

(86) PCT No.: PCT/US2015/064456
§ 371 (c)(1),
(2) Date: May 30, 2017

(87) PCT Pub. No.: WO2016/094383
PCT Pub. Date: Jun. 16, 2016

(65) Prior Publication Data
US 2017/0307469 A1    Oct. 26, 2017

Related U.S. Application Data

(60) Provisional application No. 62/088,878, filed on Dec. 8, 2014, provisional application No. 62/109,098, filed on Jan. 29, 2015.

(51) Int. Cl.
*G01M 11/02* (2006.01)
*H04N 17/00* (2006.01)
(Continued)

(52) U.S. Cl.
CPC ......... *G01M 11/0292* (2013.01); *G02B 25/02* (2013.01); *G02B 27/0012* (2013.01);
(Continued)

(58) Field of Classification Search
None
See application file for complete search history.

(56) References Cited

U.S. PATENT DOCUMENTS

| 4,241,996 A | 12/1980 | Weiser |
| 5,748,230 A | 5/1998 | Orlando et al. |

(Continued)

OTHER PUBLICATIONS

PCT/US15/64456 International Search Report and Written Opinion, completed Feb. 7, 2016.

*Primary Examiner* — Tung S Lau
(74) *Attorney, Agent, or Firm* — Tarolli, Sundheim, Covell & Tummino LLP

(57) ABSTRACT

A system for evaluating the modulation transfer function (MTF) of a device under test is provided. The system includes an image projector configured to provide light in a pattern representing a desired image. The system further includes a lens configured to direct the provided light toward the device under test as a collimated beam. An image analysis component calculates the MTF for the device under test from the at least one image taken at the device under test and the known characteristics of the image projector and the lens.

8 Claims, 5 Drawing Sheets

(51) Int. Cl.
- *G02B 25/02* (2006.01)
- *G02B 27/00* (2006.01)
- *G05B 23/02* (2006.01)
- *G01M 11/00* (2006.01)
- *G02B 25/00* (2006.01)

(52) U.S. Cl.
CPC ....... *G05B 23/0202* (2013.01); *H04N 17/002* (2013.01); *G01M 11/00* (2013.01); *G02B 25/00* (2013.01)

(56) References Cited

U.S. PATENT DOCUMENTS

| | | |
|---|---|---|
| 6,333,826 B1 | 12/2001 | Charles |
| 6,977,717 B1 | 12/2005 | Lalovic et al. |
| 9,217,687 B2 | 12/2015 | Orband |
| 2003/0227611 A1* | 12/2003 | Fein ................ G01N 1/2813 356/36 |
| 2012/0062723 A1 | 3/2012 | Ghosh et al. |
| 2012/0075696 A1 | 3/2012 | Jung et al. |
| 2014/0253738 A1* | 9/2014 | Mullis ............... H04N 5/23245 348/187 |
| 2014/0320672 A1* | 10/2014 | Little ..................... G02B 27/62 348/187 |
| 2014/0339445 A1 | 11/2014 | Sharpe et al. |

\* cited by examiner

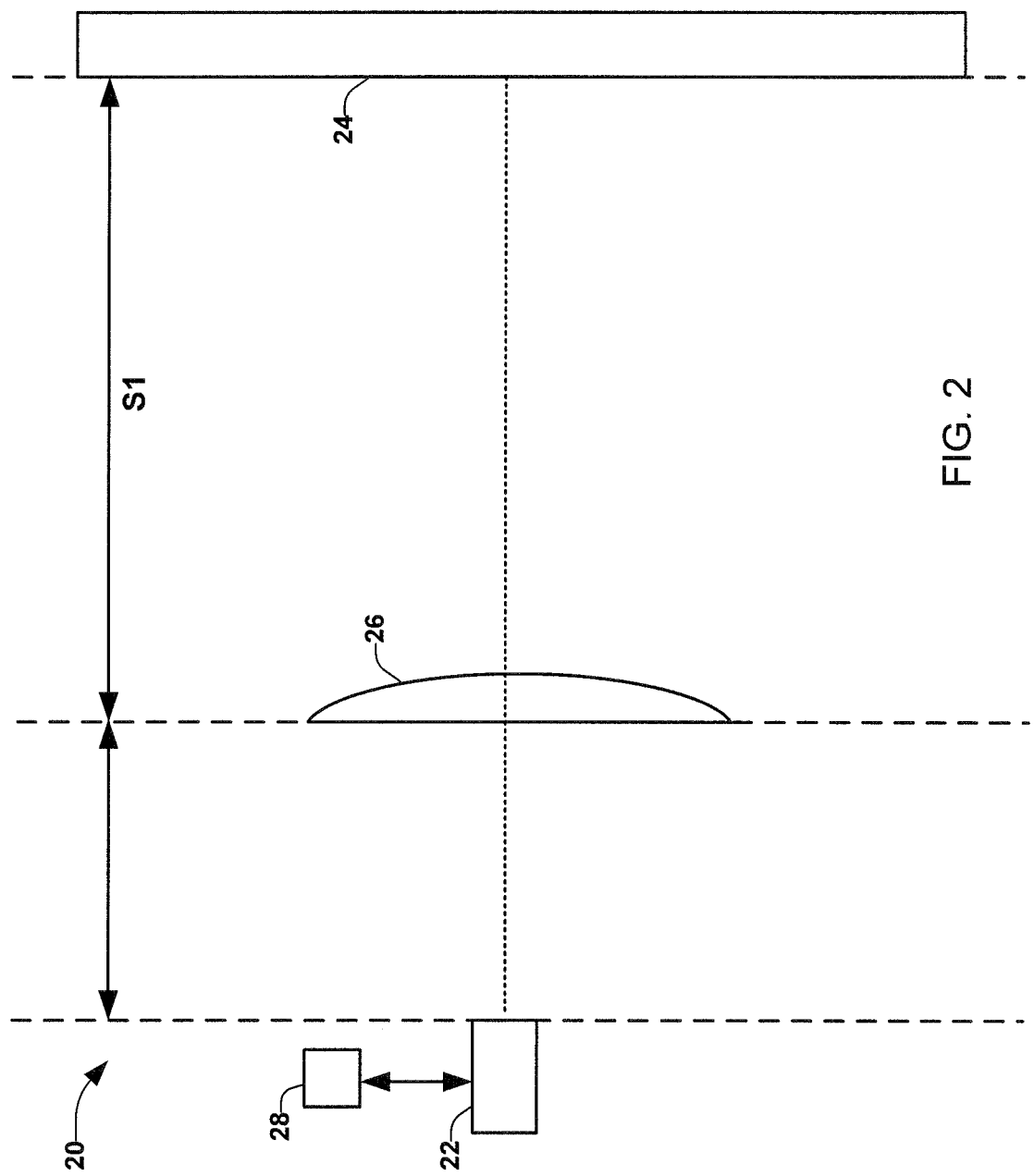

COMPACT MODULAR TRANSFER FUNCTION EVALUATION SYSTEM

RELATED APPLICATION

This application claims priority from U.S. Provisional Application No. 62/088,878, filed Dec. 8, 2014, and U.S. Provisional Application No. 62/109,098, filed Jan. 29, 2015, the subject matter of both are incorporated herein by reference.

TECHNICAL FIELD

This invention relates to optics, and more particularly, to a compact modulation transfer function evaluation system for a camera.

BACKGROUND

The modulation transfer function ("MTF") of a camera is a measurement of the camera's ability to transfer contrast at a particular resolution from an imaged object to a camera image. The MTF is a way to incorporate resolution and contrast into a single specification. MTF is the key to measure the sharpness of image, and to quantify the overall imaging performance of a camera system in terms of resolution and contrast. As a result, knowing the MTF of each imaging lens and camera sensor within a system allows a designer to make the appropriate selection when optimizing the camera system for a particular resolution.

SUMMARY OF THE INVENTION

In accordance with an aspect of the present invention, a system is provided for evaluating the modulation transfer function (MTF) of a device under test. An image projector is configured to provide light in a pattern representing a desired object. A lens is configured to direct the provided light toward the device under test. An image analysis component is configured to calculate the MTF for the device under test from the at least one image taken at the device under test and the known characteristics of the image projector and the lens.

In accordance with another aspect of the present invention, a method is provided for evaluating the modulation transfer function (MTF) of a device under test. A collimated beam of patterned light is projected directly to an aperture of the device under test through an objective lens. At least one image of the patterned light is captured, and the MTF for the device under test is calculated from the at least one image taken at the device under test and the known characteristics of the objective lens.

In accordance with yet another aspect of the present invention, a system is provided for evaluating system for evaluating the modulation transfer function (MTF) of a device under test. An image source configured to provide light in a pattern representing a desired image. A lens configured to direct the provided light toward the device under test, wherein the device under test, the image source and the lens are arranged along a common optical axis to provide a magnified virtual image to replicates an image at a hyper-focal distance. An image analysis component configured to calculate the MTF for the device under test from the at least one image taken at the device under test and the known characteristics of the image source and the lens.

In accordance with still another aspect of the present invention, a method is provided for evaluating the modulation transfer function (MTF) of a device under test. A camera, an image source and a lens are arranged along a common optical axis. The lens is selected to provide a magnified virtual image to replicate an image at a hyper-focal distance for the camera. An image of patterned light is displayed directly to an aperture of the device under test through an objective lens. At least one image of the patterned light is captured. The MTF for the device under test is then calculated from the at least one image taken at the device under test and the known characteristics of the objective lens.

BRIEF DESCRIPTION OF THE DRAWINGS

FIG. 2 illustrates another example of a system for evaluating the modulation transfer function of a camera;

DETAILED DESCRIPTION

One method of determining the modulation transfer function ("MTF") of a camera has been to place a set of targets at a hyper-focal distance of the camera. In one implementation of this method, printed targets are mounted to a wall. There are total of eleven targets, with one for on-axis measurements and the other ten used for off-axis measurements. The device under test ("DUT") and the targets are separated by a hyper-focal distance of the camera, and the wall targets are illuminated by an LED light panel. Reflected light from the targets is captured by the DUT, and metrics are measured and utilized to provide MTF scores of the available slant edges measured by the module. While this is an effective method for camera testing, the hyper-focal distance of many cameras is significant, and the method can require a very large testing footprint. In one camera used in intelligent vehicle safety systems, the hyper-focal distance is five (5) m, and the method requires a working space having a volume of 3.44 m×2.74 m×5 m. Further, the targets are not always illuminated by an equal amount of light.

In particular, cameras are often incorporated in a vehicle platform to provide additional information to intelligent vehicle safety systems to aid the driver. One or more cameras may be mounted in various locations around the vehicle, placed to provide additional awareness of environmental conditions to the driver and to intelligent vehicle safety systems. For example, a driver assist camera can be placed near or on the vehicle windshield to ensure a maximum field of view of the environment in front of the car.

Additionally or alternatively, cameras can be placed so as to view the rear of the vehicle, for assisting when the vehicle is moving in reverse, or top or side views to aid in greater situational awareness. To ensure proper operation of the cameras and therefore ensure useful data is provided to the vehicle's intelligent safety systems, tests can be performed to ensure that the installed cameras are suitable for a vehicle platform. Thus, as noted, a vehicle may employ a camera with a five (5) m hyper-focal distance or an alternative hyper-focal distance, and perform a method for determining the MTF of the camera, in accordance with the principles and examples provided herein.

Figure 1:
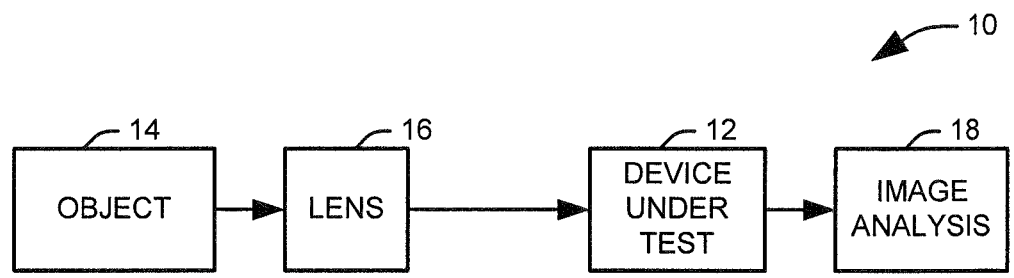
FIG. 1 illustrates an example of a system for evaluating the modulation transfer function of a camera.

FIG. 1 illustrates an example of a system 10 for evaluating the modulation transfer function of a device under test 12 in accordance with the present invention. The system 10 includes an object 14 configured to provide a pattern representing a desired image. In one implementation, the object 14 includes an appropriate coherent or non-coherent light source passed through a transparent plate having a pattern of opaque or translucent material thereon to provide the desired pattern. For example, the light source can include a laser at a desired wavelength to provide a narrow band but already collimated source of light, or a non-coherent source having a wider spectrum. Alternatively, the object 14 can represent a display, such as a LCD display, provided with appropriate input to display one or more targets.

A lens 16 is configured to direct light representing the provided pattern from the image source toward the device under test 12. In accordance with one example embodiment of the present invention, the lens 16 is a doublet objective lens. It will be appreciated that the system 10 could include multiple images sources and lens (not shown) to provide a plurality of targets to the device under test 12. At least one image from the device under test 12 is provided to an image analysis component 18. The image analysis component 18 is configured to calculate a MTF for the device under test 12 from the at least one image taken at the device under test 12 and the known characteristics of the object 14 and the lens 16.

FIG. 2 illustrates another example of a system 30 for evaluating the modulation transfer function of a device under test 32 in accordance with the present invention. The system 30 includes an image source 34 configured to provide a pattern representing a desired image. In one implementation, the image source 34 includes an appropriate coherent or non-coherent light source passed through a transparent plate having a pattern of opaque or translucent material thereon to provide the desired pattern. Alternatively, the image source 34 can represent a display, such as a LCD display, provided with appropriate input to display one or more targets, such as the example target arrangement 166 illustrated in FIG. 7. Additionally or alternatively, the image source 34 can be a dynamic display, such that the target arrangement can modified in real time as the desired image and or testing conditions require. In the illustrated example, the distance between the relay lens 36 and image source 34 is reduced to approximately 370 mm, such that the optical test system 30 provides functionality similar to a larger, full size and full distance 5 m test system.

A lens 36 is configured to direct light representing the provided pattern from the image source toward the device under test 32. Further, a virtual image is created at the image source 34 simulating the effect of placing a target object in a test environment at 5 m. Note that the lens 36 could be multiple lenses with different optical properties employed to improve the image of the object, modify the virtual distance of the object, or other considerations for image capture and processing. In the example of FIG. 2, the relay lens 36 can be, for example, a plano-convex lens. Further, the location and arrangement of elements can be calculated by employing the Gaussian thin lens formula as shown in Equation 1:

$$\frac{1}{S_1} + \frac{1}{S_2} = \frac{1}{f} \qquad \text{Equation 1}$$

In Equation 1, f is the focus length of a thin lens, such as lens 36, S2 is the distance of the virtual image from the center of lens 36, and S1 is the object distance to the center of the lens. S1 is positive if the object is on the left side of the lens. S1 is negative if the object is on the right side of lens 36. S2 is positive if the object is on the right side of lens 36, S2 is negative if the object is on the left side of lens 36. If f is substituted with f=400 mm=0.4 m, and S2=−5 m are put into Equation 1, then S1=370.4 mm. Accordingly, the image source 34 can be positioned at a distance of S1=370.4 mm from the relay lens. In order to ensure an enlarged vertical image, the object, here a virtual image on the image source 34, should be placed before the calculated focus point, such as 370.4 mm<400 mm.

In the example system 30, the virtual image should have a transverse magnification determined as the ratio of the hyper-focal distance and the distance between the lens and the image source 34. Thus, the transverse magnification can be calculated as $M_T$=5/0.3704=13.5 in order to replicate a target image at a distance of 5 m. Therefore, in order to replicate an object with dimensions of 164"×112" at 5 m, the virtual image on the image source 64 should be approximately 12.15"×8.3". In one example, the image source 34 is a monitor dimensioned at 24" which is sufficient to display the target image with the appropriate dimensions.

In accordance with one example embodiment of the present invention, the lens 36 is a doublet objective lens. It will be appreciated that the system 30 could include multiple images sources and lens (not shown) to provide a plurality of targets to the device under test 32. At least one image from the device under test 32 is provided to an image analysis component 38. The image analysis component 38 is configured to calculate a MTF for the device under test 32 from the at least one image taken at the device under test 32 and the known characteristics of the image source 34 and the lens 36. Moreover, in a test comparison of the MTF optical test system 30 and a full size and full distance 5 m test system, image quality sharpness comparison between systems suggest that the optical test system 30 provides a strong correlation of image quality in comparison to the full size and full distance 5 m test system.

Figure 3:
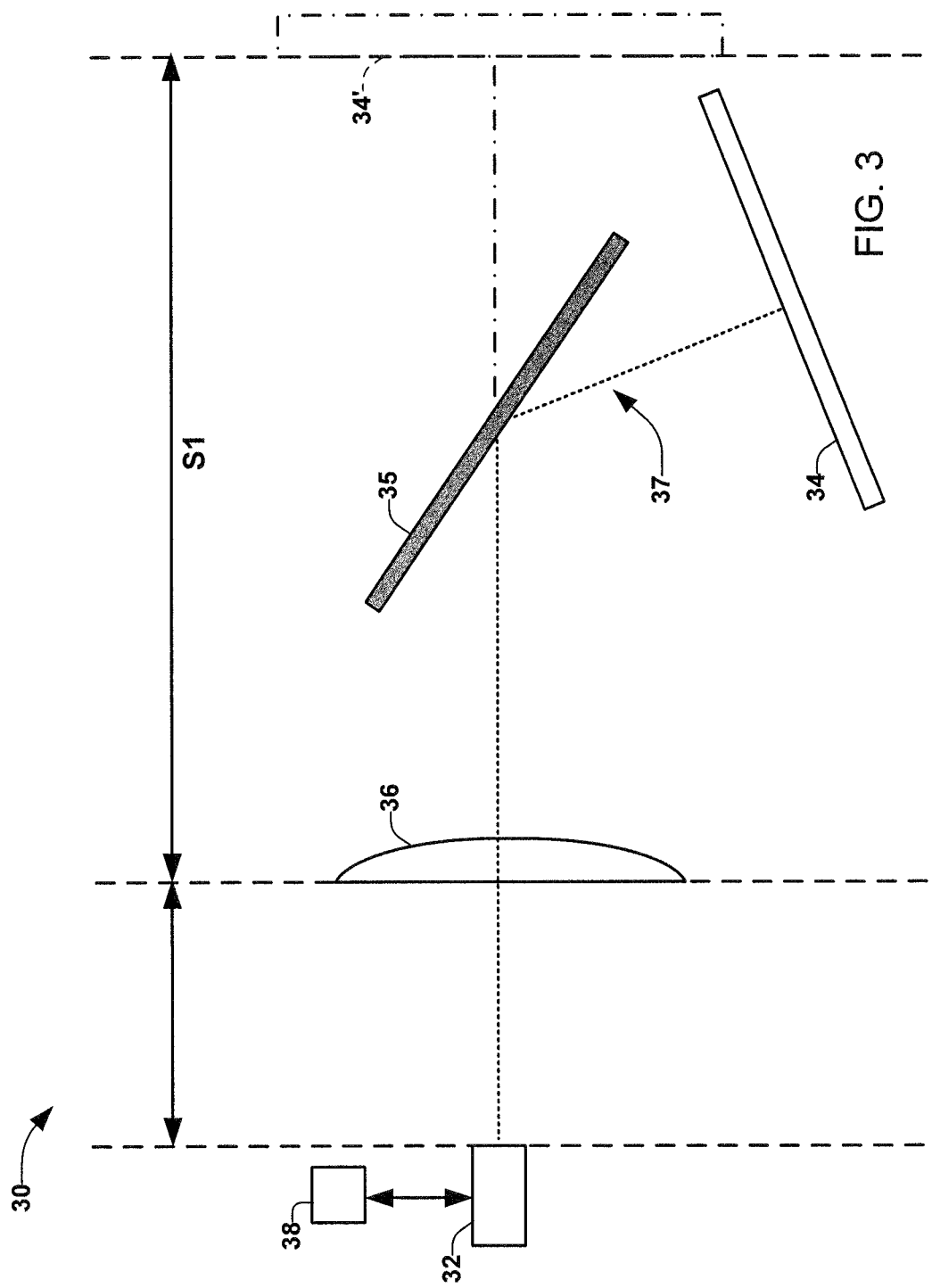
FIG. 3 illustrates yet another example of a system for evaluating the modulation transfer function of a camera in accordance with the present invention.

FIG. 3 illustrates yet another example system 30 for evaluating the modulation transfer function of a camera 32 in accordance with the present invention. In the example of FIG. 3, a mirror 35 is used in the optical pathway 37 to further reduce the size and the space between the relay lens 36 and the monitor 34. The system 30 includes an image source 34 configured to provide light in a pattern representing a desired image. In the illustrated implementation, the image source 34 includes a dynamic display such as an LCD monitor. A lens 36 is configured to direct the provided light from the image source 34 toward the camera 32 such that the desired image appears as a virtual image 34'. In the illustrated implementation, the lens 36 is a plano-convex lens. Images captured by the camera can be provided to an image analysis component 38 for calculation of the MTF. In the illustrated implementation, a mirror 35 is tilted at approximately 34°, and the image source 34 is tilted at approximately 22° as shown in FIG. 3. To ensure the center beam of the optical signal from the image source 34 is measured from the center of the monitor to the center axis of the lens 36, the tilt angles of image source 34 and mirror 35 should be designed as the total angle: 34°+34°+22°=90°. Therefore, the tilt angles comply with established optical principles.

As a result, the footprint of the testing assembly is significantly decreased. In the example of FIGS. 2 and 3, a test of substantially identical quality can be performed in a footprint of only 85 mm×65 mm×60 mm. It will be appreciated that this reduced footprint can provide significant savings in cost and increase the ease of use of the system. In comparisons with the standard arrangement, the system of FIGS. 2 and 3 has been found to provide a mean MTF value for the device under test within five percent of that of approved method data at a ninety-five percent confidence level.

In yet another method of determining the MTF of a camera, a set of targets is located at a hyper-focal distance of the camera. The device under test and the targets are separated by a hyper-focal distance of the camera, and the targets are provided at an illuminated target, such as on an LCD monitor. Light from the targets is captured by the DUT, and metrics are measured and utilized to provide MTF scores of the available slant edges measured by the module.

Figure 4:
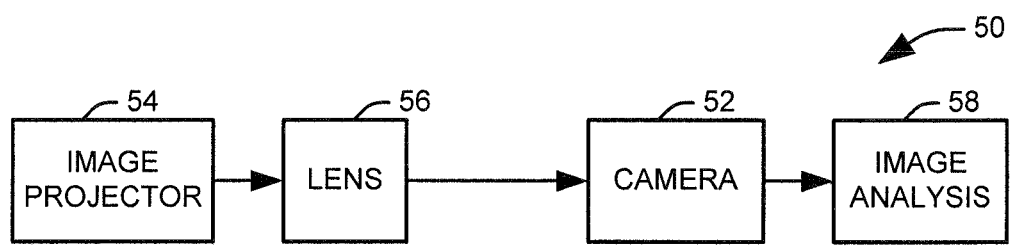
FIG. 4 illustrates still another example of a system for evaluating the modulation transfer function of a camera in accordance with the present invention

FIG. 4 illustrates another example of a system 50 for evaluating the modulation transfer function of a camera 52 in accordance with the present invention. The system 50 includes an image projector 54 configured to provide light in a pattern representing a desired image. In the illustrated implementation, the image projector 54 includes a light source that is passed through a patterned plate to project the desired pattern. For example, the light source can include a laser at a desired wavelength to provide a narrow band but already collimated source of light, or a non-coherent source, such as a light emitting diode (LED), a fluorescent bulb, or an incandescent bulb, to provide a wider spectrum. A lens 56 is configured to direct the provided light from the image source toward the camera 52 as a collimated beam. In the illustrated implementation, the lens 56 is a doublet objective lens. Images captured by the camera can be provided to an image analysis component 58 for calculation of the MTF.

Figure 5:
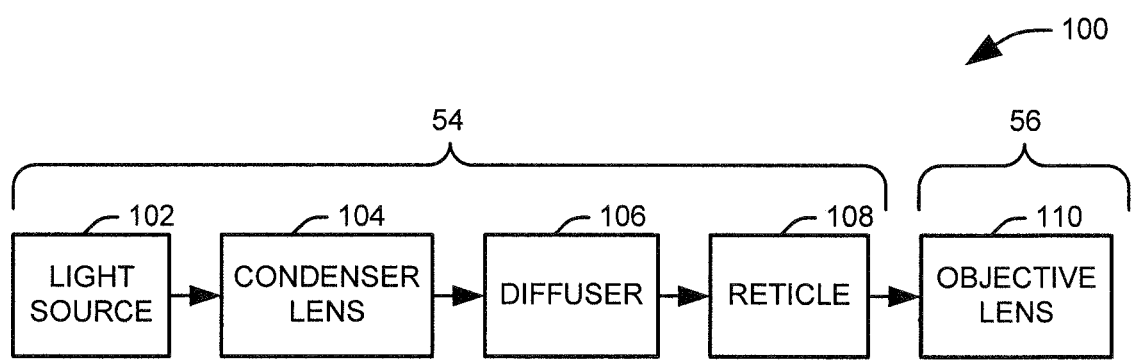
FIG. 5 illustrates one example of a collimated target source that can be used in system for evaluating the modulation transfer function of a camera.

FIG. 5 illustrates one example of a collimated target source 100, representing the image source 54 and lens 56 of FIG. 2, that can be used in a system for evaluating the modulation transfer function of a camera in accordance with the present invention. In the illustrated example embodiment, the collimated target source 100 comprises a plurality of optical components 102, 104, 106, 108, and 110 placed within a housing (not shown). The optical components include a light source 102, which can provide coherent or non-coherent light. In accordance with one example embodiment, the light source 102 is a white LED light emitting diode with a spectrum from 440 to 660 nm. The diode was encapsulated in a round clear epoxy casing with a five (5) mm diameter. An aspheric condenser lens 104 is used to make the output of the light source less divergent. In the example embodiment, the focal length of the lens is 8 mm with a 12.7 mm diameter. The light source 102 is placed at the focal point of the lens 104.

A fine grit diffuser 106 is located forward of the condenser lens 104 to homogenize the illumination source. A patterned reticle 108 is used to apply a desired pattern to the light source. In the example embodiment, the reticle 108 is made from patterned metal, such as chrome, on glass to produce a desired target. It will be appreciated, however, that the reticle 108 can include patterning with a material that is transparent to a specific band of wavelengths, as well as fully or partially opaque materials, to project a desired color or grayscale image. In the illustrated implementation, the reticle 108 can have a total diameter of 12.7 mm, with the patterned target having a width of about 2.4 mm.

Transmitted light through the reticle is collimated by an objective lens 110, with the reticle 108 placed at the back focal length of the objective lens. In accordance with the example embodiment, a thirty (30) mm focal length achromatic doublet lens is used to collimate the transmitted light from the reticle 108. The objective lens 110 can have an antireflective coating effective across the visible range (e.g., for wavelengths from 400 nm to 700 nm). It will be appreciated that the doublet design significantly reduces the chromatic aberration. This is of particular importance, as minimizing the distortion introduced by the lens reduces the complexity of accounting for the lens in the MTF evaluation of the device under test.

In the illustrated examples, the target source 100 has a total length of approximately one hundred sixty (160) mm, and a diameter of approximately thirteen (13) mm. The light source 102 is separated from the condenser lens 104 by approximately eight (8) mm. The condenser lens 104 is separated from the diffuser 106 by approximately thirty (30) mm. The diffuser 106 is separated from the reticle 108 by approximately seventy (70) mm, and the objective lens 110 is separated from the reticle 108 by about twenty seven and a half (27.5) mm.

Figure 6:
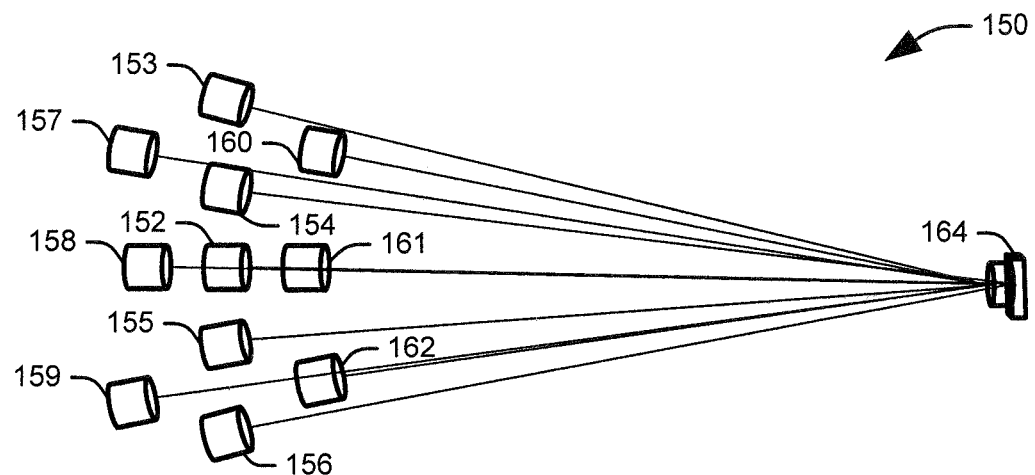
FIG. 6 illustrates a schematic diagram of a testing system in accordance with an aspect of the present invention.
Figure 7:
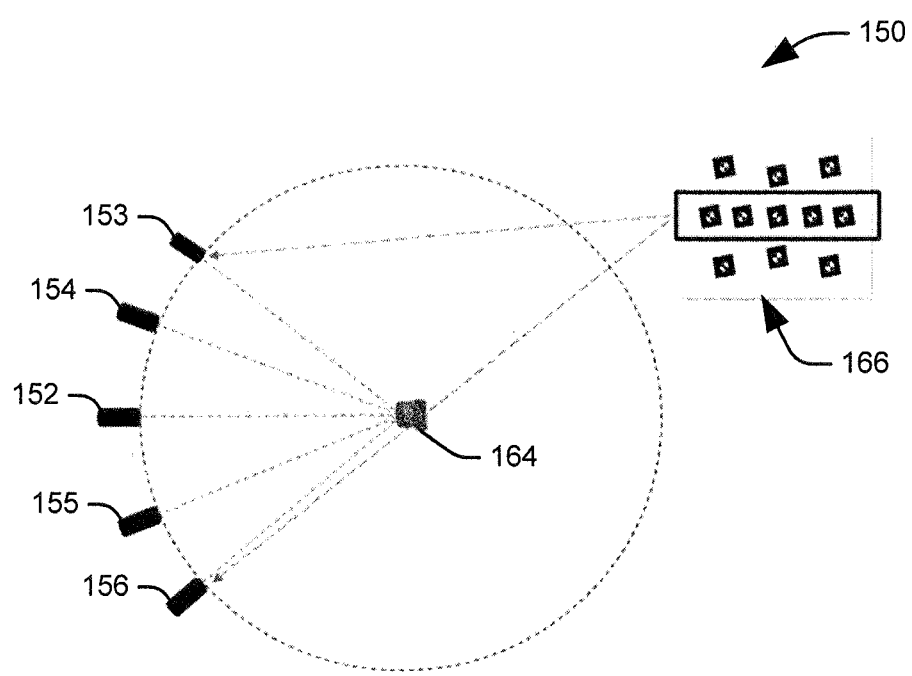
FIG. 7 depicts the testing system of FIG. 6 along a cross-section passing through a center point of an aperture of the device under test.

It will be appreciated that a test system could include multiple targets sources, such as those described in FIG. 5, to provide a plurality of targets to a device under test for analysis. FIG. 6 illustrates a schematic diagram of a testing system 150 in accordance with an aspect of the present invention. FIG. 7 depicts the testing system 150 of FIG. 6 along a cross-section passing through a center point of an aperture of the device under test.

In the illustrated example, the system 150 utilizes eleven collimated target sources 152-162 arranged within a field of view of a device under test 164, such that each target source projects a collimated beam into an aperture of the device under test. A first target source 152, referred to as an "on-axis" source is positioned and oriented as to provide light to a center of an aperture of the device under test, while a plural set of "off-axis" target sources 153-162, are positioned and oriented to provide light to positions with the aperture that are spatially separated from the center of the aperture. In the illustrated implementation, targets of substantially equal size are desired, and thus the plurality of target sources are positioned such that each of the target sources 152-162 is equidistant from the device under test. In the illustrated implementation, this distance is fifty (50) mm, and the device under test 164 has a hyper-focal distance of approximately five (5) m. Accordingly, the distance between the target sources 152-162 and the device under test 164 can be reduced less than two percent.

It will be appreciated that the plurality of target sources can project a same pattern or different patterns, according to the desired application. In one analysis of the MTF for a device under test compatible with the illustrated system 150, the desired targets are identical, but some targets are at different orientations than others. To simply manufacture of the plurality of target sources 152-162, each of the target sources can be identical, but a first target source can be rotated, relative to a second target source, along an axis coinciding with a direction of its projected collimated beam, such that a first image received at the device under test from the first target source is rotated relative to a second image received at the device under test from the second target source.

This illustrated compact MTF testing assembly 150 allows for a significant decrease in the necessary footprint for MTF testing providing a virtual image to the device under test. In the standard system, light reaching a device under test from a wall target at hyper-focal distance represents nearly parallel beams. In the proposed method, each target source 152-162 produces a collimated beam, eliminating the requirement of placing the device under test 164 at the hyper-focal distance. As a result, the footprint of the testing assembly is significantly decreased. In the example OF FIGS. 6 and 7, a test of substantially identical quality can be performed in a footprint of only 85 mm×65 mm×60 mm. It will be appreciated that this reduced footprint can provide significant savings in cost and increase the ease of use of the system. In comparisons with the standard arrangement, the system of FIGS. 6 and 7 has been found to provide a mean MTF value for the device under test within five percent of that of approved method data at a ninety-five percent confidence level.

Figure 8:
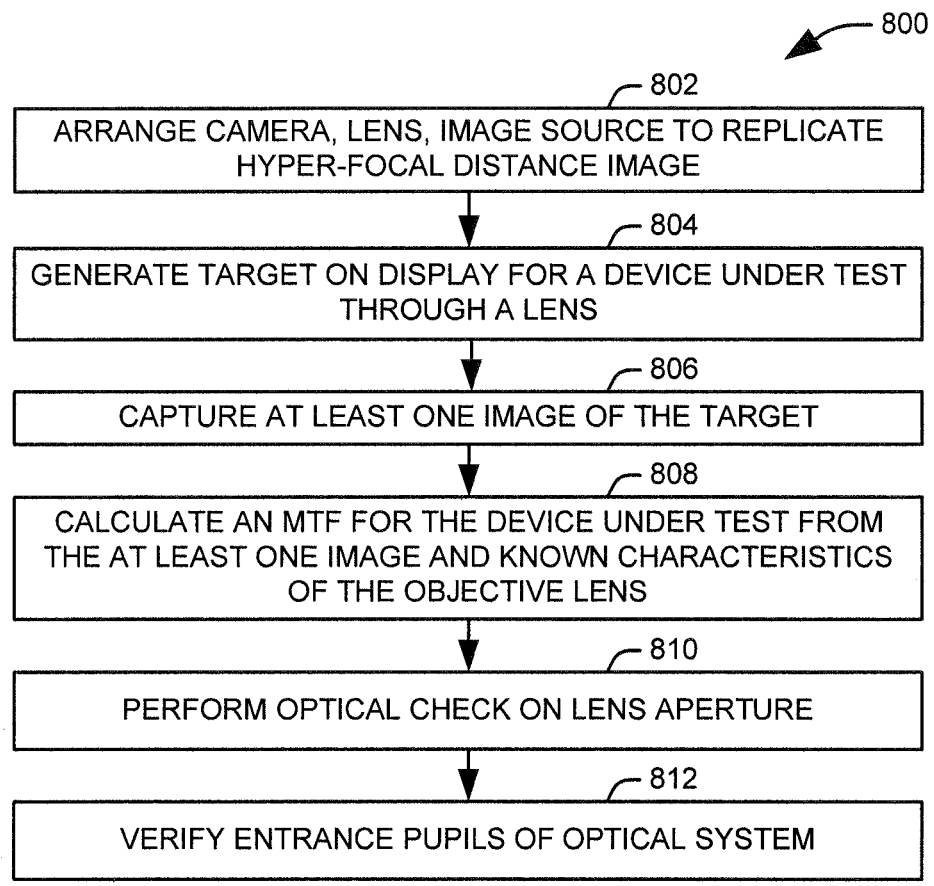
FIG. 8 illustrates a method 800 for evaluating the modulation transfer function (MTF) of a device under test.
Figure 9:
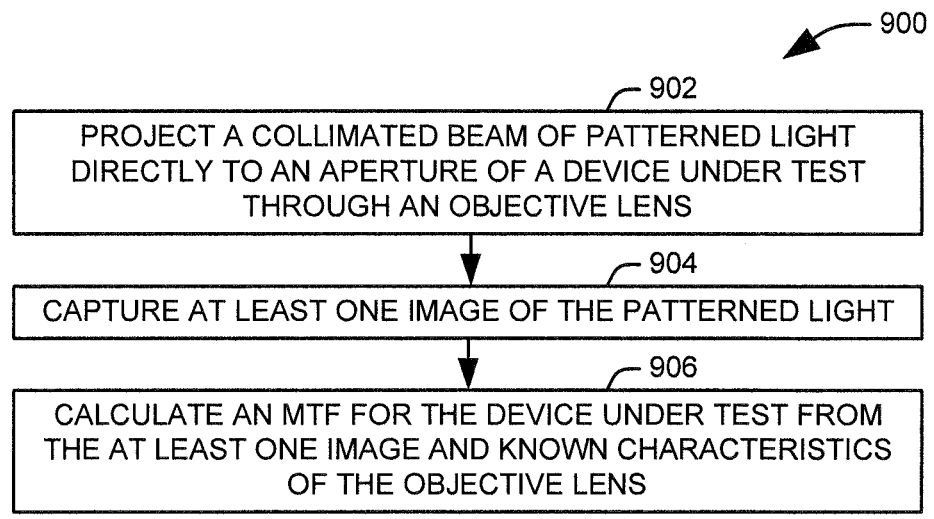
FIG. 9 illustrates another method 900 for evaluating the modulation transfer function (MTF) of a device under test.

In view of the foregoing structural and functional features described above in FIGS. 1-7, example methodologies will be better appreciated with reference to FIGS. 8 and 9. While, for purposes of simplicity of explanation, the methodologies of FIGS. 8 and 9 are shown and described as executing serially, it is to be understood and appreciated that the present invention is not limited by the illustrated order, as some actions could in other examples occur in different orders and/or concurrently from that shown and described herein.

FIG. 8 illustrates a method 800 for evaluating the modulation transfer function (MTF) of a device under test. At 802, a camera, a lens and a display are arranged along a common optical axis to provide a magnified virtual image that replicates a real image at a hyper-focal distance. At 804, a target pattern is generated on the display directly to an aperture of the camera through the lens. It will be appreciated that, in accordance with an aspect of the present invention, the display can be separated from the camera by less than two percent of a hyper-focal distance of the device under test. At least one image of the target pattern is captured at 806. At 808, the MTF for the camera under test is calculated from the at least one image taken at the camera and the known characteristics of the lens. Moreover, a test can be employed on the system. At 810, an optical check can determine if the relay lens aperture is sufficient to cover the field of view (FOV) of the S-cam system, and the mirror size is sufficient to cover the FOV of S-cam and lens. Additionally, at 812 a ray-tracing diagram with the detailed S-cam optical specifications can be employed to verify the entrance pupils of the S-cam camera to ensure that both are greater than the FOV.

FIG. 9 illustrates a method 900 for evaluating the modulation transfer function (MTF) of a device under test. At 902, a collimated beam of patterned light is projected directly to an aperture of the device under test through an objective lens. It will be appreciated that, in accordance with an aspect of the present invention, the source of the collimated beam of light can be separated from the device under test by less than two percent of a hyper-focal distance of the device under test. In one example, a plurality of collimated beams of patterned light can be provided directly to the aperture of the device under test from a plurality of target sources, with each target source including a light source, a patterned reticle, and an objective lens. At least one image of the patterned light is captured at 904. In the implementation using plural target sources, each of the captured at least one image represents the plurality of collimated beams of patterned light. At 906, the MTF for the device under test is calculated from the at least one image taken at the device under test and the known characteristics of the objective lens.

What have been described above are examples of the present invention. It is, of course, not possible to describe every conceivable combination of components or methodologies for purposes of describing the present invention, but one of ordinary skill in the art will recognize that many further combinations and permutations of the present invention are possible. While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. Accordingly, the present invention is intended to embrace all such alterations, modifications, and variations that fall within the scope of the appended claims. No feature of the invention is critical or essential unless it is expressly stated as being "critical" or "essential."

What is claimed is:

1. A system for evaluating the modulation transfer function (MTF) of a device under test, comprising:
   an image projector configured to provide light in a pattern representing a desired image;
   a lens configured to direct the provided light toward the device under test as a collimated beam;
   an image analysis component configured to calculate the MTF for the device under test from the at least one image taken at the device under test and the known characteristics of the image projector and the lens, each of the image projector and the lens being positioned within a housing to form a target source configured to project a desired target to an aperture of the device under test; and
   a plurality of target sources, each comprising an image projector and a lens, the plurality of target sources being positioned such that each of the target sources is substantially equidistant from the device under test, the distance from each target source to the device under test being less than two percent of a hyper-focal distance of the device under test.

2. The system of claim 1, wherein at least one lens is an achromatic doublet lens.

3. The system of claim 1, wherein at least one image projector comprises a light source and a patterned reticle, positioned such that a pattern on the patterned reticle is projected toward the device under test.

4. The system of claim 1, the plurality of target sources comprising a first target source, positioned and oriented as to provide light to a center of an aperture of the device under test, and at least two other target sources, positioned and oriented to provide light to positions with the aperture that are spatially separated from the center of the aperture.

5. The system of claim 1, each of the plurality of target sources being configured to provide a collimated beam of light in a given direction, the plurality of target sources comprising a first target source that is rotated, relative to a second target source, along an axis coinciding with given direction, such that a first image received at the device under test from the first target source is rotated relative to a second image received at the device under test from the second target source.

6. The system of claim 3, the at least one lens being a first lens, and the at least one image projector further comprising a second lens positioned between the light source and the patterned reticle, the patterned reticle being positioned between the first lens and the second lens.

7. The system of claim 3, the at least one image projector further comprising a diffuser, configured to homogenize light from the light source, the diffuser being positioned between the light source and the patterned reticle.

8. The system of claim 6, wherein the first lens is an achromatic doublet lens and the second lens is an aspherical condenser lens.

* * * * *